United States Patent [19]
Mascia et al.

[11] Patent Number: 5,850,780
[45] Date of Patent: Dec. 22, 1998

[54] COOKING APPARATUS

[76] Inventors: Hugo R. Mascia; Maria S. Mascia, both of 808 Calle Pluma, San Clemente, Calif. 92673

[21] Appl. No.: 811,409

[22] Filed: Mar. 4, 1997

[51] Int. Cl.[6] .............................. A47J 37/04; A47J 37/06
[52] U.S. Cl. ............................... 99/427; 99/400; 99/401; 99/443 C; 99/446; 99/447; 99/448; 126/21 A
[58] Field of Search ........................... 99/330, 386, 401, 99/400, 443 R, 443 C, 467, 474–479, 427, 447, 352, 448, 483, 444–446; 126/21 A, 369, 25 R; 134/145, 151; 34/203, 207; 219/388, 400; 426/523, 510

[56] References Cited

U.S. PATENT DOCUMENTS

| | | | |
|---|---|---|---|
| 3,435,754 | 4/1969 | Lohr et al. | 99/443 R |
| 3,643,588 | 2/1972 | Schwartz et al. | 99/427 |
| 3,847,069 | 11/1974 | Guibert | 99/443 R |
| 3,928,045 | 12/1975 | Tsunoda et al. | 99/330 |
| 4,023,007 | 5/1977 | Brown | 219/388 |
| 4,026,202 | 5/1977 | Szpur | 99/355 |
| 4,072,093 | 2/1978 | Zimmer et al. | 99/443 R |
| 4,132,216 | 1/1979 | Guibert | 126/261 |
| 4,151,791 | 5/1979 | Baker | 99/339 |
| 4,154,152 | 5/1979 | Lang-Ree et al. | 99/386 |
| 4,191,881 | 3/1980 | Ahlgren et al. | 219/388 |
| 4,401,018 | 8/1983 | Berry | 99/420 |
| 4,867,051 | 9/1989 | Schalk | 99/443 C |
| 5,123,336 | 6/1992 | Konig | 99/355 |
| 5,205,207 | 4/1993 | McGuire | 99/340 |
| 5,313,877 | 5/1994 | Holland | 99/446 |
| 5,322,007 | 6/1994 | Caridis et al. | 99/386 |
| 5,371,829 | 12/1994 | Hoeberigs | 392/416 |
| 5,442,999 | 8/1995 | Meister | 99/426 |

*Primary Examiner*—Timothy F. Simone
*Attorney, Agent, or Firm*—Brown, Martin, Haller & McClain, LLP

[57] ABSTRACT

An outer housing has an inner cooking chamber and at least one opening for air flow into the cooking chamber. A heat source is located at the center of a lower wall of the cooking chamber. A plurality of food holding racks for supporting food to be cooked are mounted on a mounting assembly at spaced intervals in an annular path around the heat source. The mounting assembly is rotated by a drive mechanism so that the racks travel in the annular path around the heat source, and the racks are simultaneously rotated about their own axes to promote even cooking.

12 Claims, 4 Drawing Sheets

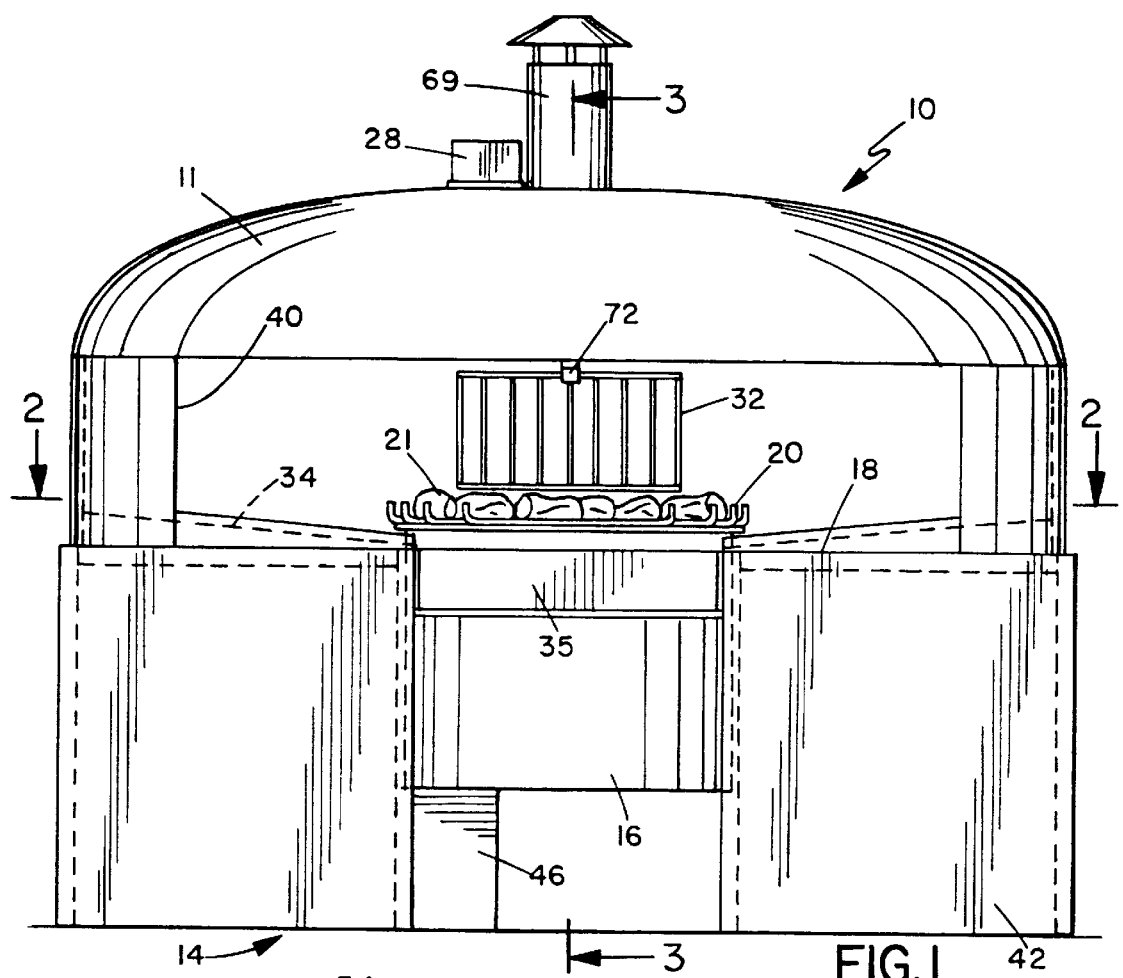
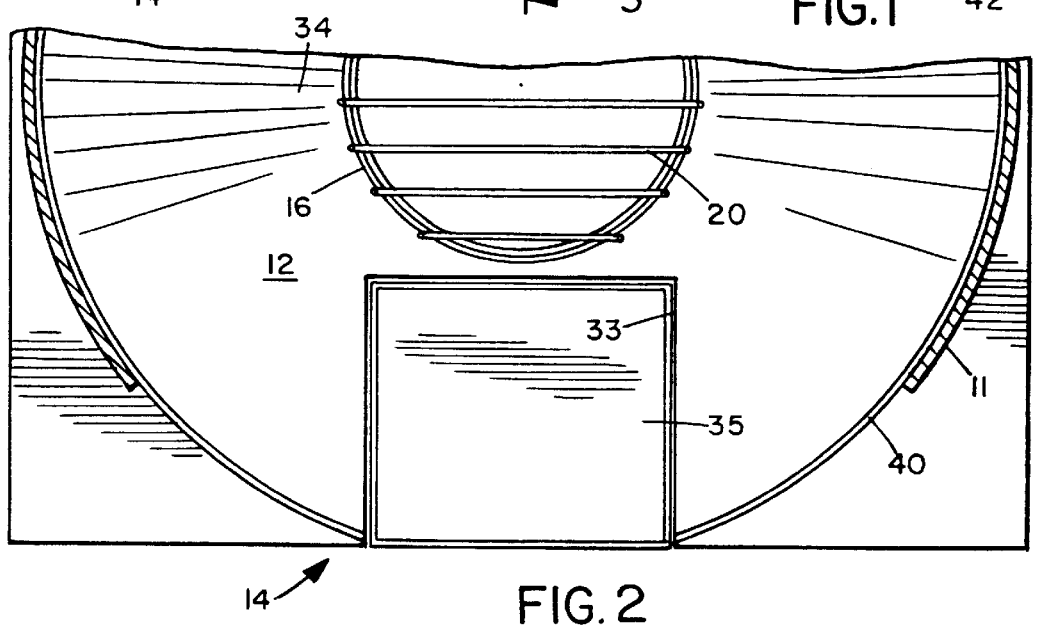

5,850,780

COOKING APPARATUS

BACKGROUND OF THE INVENTION

The present invention relates generally to a cooking apparatus for indoor or outdoor cooking.

Many different types of cooking devices are known for cooking food, such as fully enclosed ovens, barbecue grills, broilers, and the like. All known cooking devices are subject to various disadvantages. In the majority of known cooking devices, the food is cooked directly over or under a heat source. This can cause problems due to fat or grease dripping down onto the heat source, or spitting onto an overhead heat source and causing flare-ups. The fat is then burnt, creating smoke which tends to blacken the food and alter its taste, and also possibly creating carcinogens. This is a particular problem in outdoor, barbecue grills and the like.

In enclosed cooking devices, air circulation must be minimized or restricted to reduce heat loss and increase cooking efficiency. However, due to restricted air flow in the cooking chamber, the taste of the food is altered. When different foods are cooked together, the stronger tasting of the foods being cooked will tend to contaminate the taste of other foods. Direct exposure to the heat source also increases the risk of burning or otherwise damaging the food flavor, and uneven cooking.

Thus, known cooking devices such as enclosed ovens and barbecue grills are all subject to disadvantages in creating unhealthy cooking conditions, making the fat content of the food part of the cooking process when it drips down onto the heat source, and potentially creating unpleasant or imperfect flavors in the food being cooked due to contamination by smoke or other foods present in the cooking area.

SUMMARY OF THE INVENTION

It is an object of the present invention to provide a new and improved cooking apparatus which may be used either for indoor or outdoor cooking.

According to the present invention, a cooking apparatus is provided which comprises an outer housing defining a cooking chamber, the housing having at least one opening for air flow into the cooking chamber, a heat source at the center of the cooking chamber, a plurality of food holding racks for supporting food to be cooked, a mounting assembly for supporting the racks in the chamber, the mounting assembly being located above the heat source and having a plurality of radial arms extending outwardly to a location spaced outwardly from the heat source, each arm holding a respective one of the food holding racks, and a drive mechanism for rotating the mounting assembly so that the racks travel in an annular path around the heat source.

Preferably, each of the food holding racks is rotatably mounted on the respective arm, and a second drive mechanism is provided for rotating each rack about its own axis as it rotates in an annular path about the heat source. This helps to ensure even cooking of the food supported on the rack.

In a preferred embodiment of the invention, an annular drip tray is positioned around the heat source for collecting any fat, moisture or the like dripping from the food cooking in the racks. The tray is preferably tilted at least towards the front of the housing, and a removable drip pan is located at the front end of the tray. Thus, collected fat and the like will tend to travel into the drip pan, from which it can be readily cleaned. In a preferred embodiment, drip pans are provided at the front and rear of the housing.

Preferably, an inverted cone member of reflective material is located above the heat source for reflecting heat and hot air outwardly towards the food holding racks. The cone faces down towards the heat source and outwardly towards the racks, redirecting heat outwardly for more efficient cooking.

The housing is preferably dome-shaped, and has an opening at the front for access to the interior to load and unload the cooking racks. Preferably the opening extends around 40% of the periphery of the housing to define a cooking chamber which is only 60% enclosed. This is to ensure sufficient air flow to reduce cross-contamination of food tastes from one type of food to another, and also to reduce smoke in the cooking area.

The cooking apparatus provides a much healthier cooking environment since the food being cooked is not positioned directly above the heat source and is not cooked in its own juices or fat. The fat or juice will drip down into a drip pan spaced from the heat source, and therefore will not burn or produce unhealthy smoke. The cooking process is faster and more efficient, and the food will taste better than conventional barbecue cooked food or food cooked in a conventional enclosed oven with little or no air flow.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a front view of the complete cooking apparatus according to a preferred embodiment of the invention;

FIG. 2 is a sectional view taken on line 2—2 of FIG. 1;

DESCRIPTION OF THE PREFERRED EMBODIMENT

Figure 3:
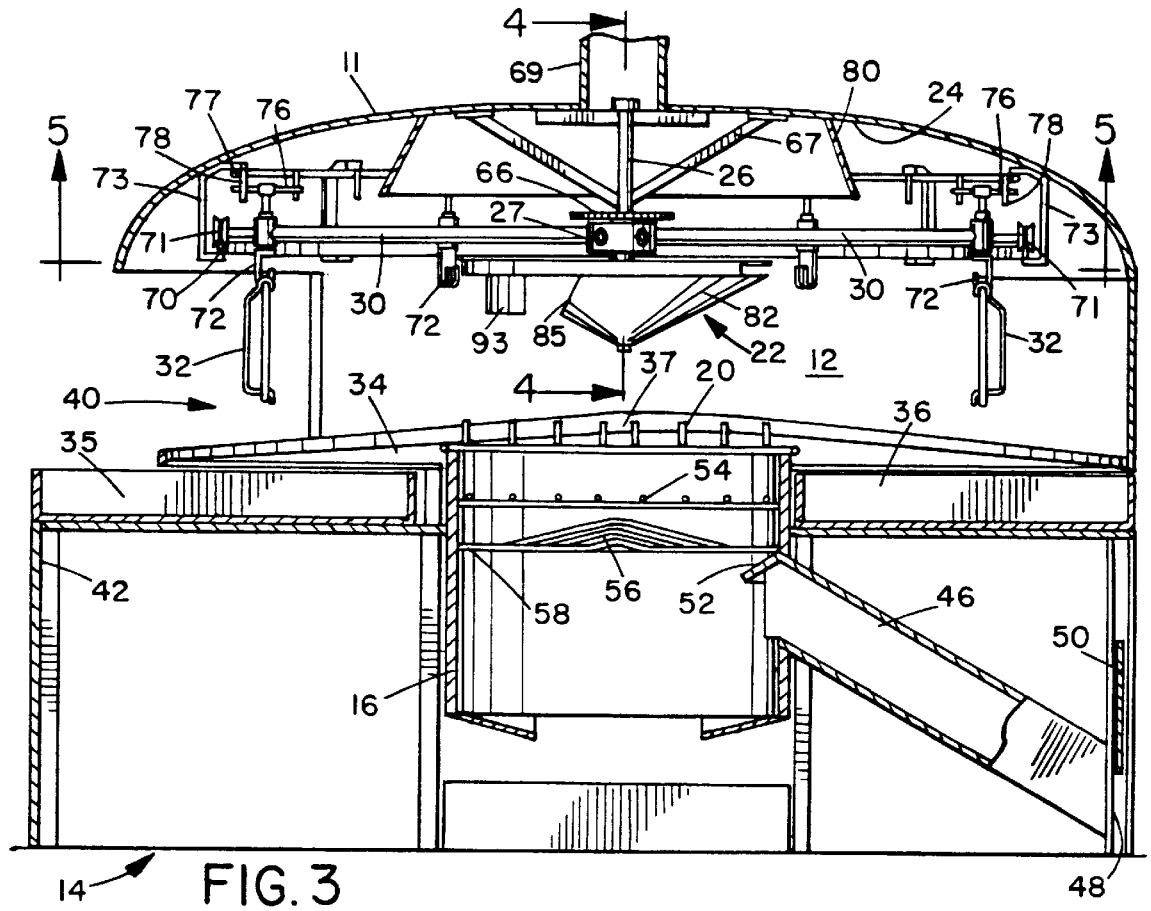
FIG. 3 is a sectional view taken on line 3—3 of FIG. 1.

FIGS. 1–9 illustrate a cooking apparatus 10 according to a preferred embodiment of the present invention. The apparatus 10 basically comprises a generally dome-shaped upper housing 11 surrounding cooking chamber 12 mounted on a base 14, as best illustrated in FIGS. 1 and 2. A cylinder 16 extends upwardly through the base and lower wall 18 of the cooking chamber 12, and a suitable grating 20 for supporting a fuel such as charcoal, wood or the like is mounted at the upper end of cylinder 16 in the center of the lower wall of the cooking chamber, as best illustrated in FIG. 3. A heat reflector device 22 is suspended from the ceiling 24 of the dome directly above the fire or heat source via support post 26. Preferably, the dome is built from heat insulating bricks and has an inner liner of metal such as stainless steel in order to reflect heat back into the cooking area and increase cooking speed. The liner covers the entire inner surface of the dome.

Hub 27 driven by motor 28 is rotatably mounted on support post 26. A plurality of radial arms 30 project outwardly from hub 27 to a location spaced outwardly from the fire or grating 20, and a food supporting rack 32 is rotatably suspended from the outer end of each arm 30.

Thus, rotation of hub 27 causes each rack to travel along an annular path around the fire or heat source on grating 20.

An annular drip tray 34 extends around the heat source on grating 20 and beneath the travel path of the food supporting racks 32. The drip tray 34 has cut-outs 33 at the front and rear of the cooking chamber in which first and second grease collector drawers or drip pans 35,36 are slidably mounted, as best illustrated in FIGS. 2 and 3. As best illustrated in FIGS. 1 and 3, the drip tray tilts downwardly from a central region 37 at each side towards the front and rear of the housing, respectively, so that any grease or moisture will tend to run down the tray and into either the front or rear grease collector drawer. Each drawer can be removed, emptied and cleaned periodically.

The cooking chamber has an opening or window 40 along the front wall of the upper housing, as illustrated in FIGS. 1 and 3. The dimensions of the opening 40 are such that the cooking chamber is only 60% enclosed. In other words, opening 40 covers an area between 30% and 50% of the total surface area of the dome-shaped upper housing, and preferably covers a 40% area. This ensures sufficient air flow to remove odors and smoke which could potentially affect the taste of the food as it cooks. The base 14 of the apparatus is preferably also enclosed within a lower housing wall 42 and may have internal shelves (not illustrated) with access doors. This provides a warming chamber where cooked food can be placed to keep warm, for example.

An air flow path is provided from outside the lower housing into the cylinder 16 and upwardly to the grating 20 to allow the fuel to burn well. As best illustrated in FIG. 3, tube 46 extends from an opening 48 in lower housing wall 42 into the central cylinder 16 to provide an air intake. A sliding shutter 50 is provided for closing the air intake as desired. The inner end of tube 46 is covered by an ash protector cone 52, to shield the tube from ash falling through the grating 20. In the preferred embodiment, grating or log holder 20 is made of spaced, parallel steel rods, suitably at a spacing of around 3.5 inches. Another grid 54 is spaced below the first grating or grid 20, and the rods in grid 54 are at a smaller spacing than those in grid or grating 20. A final, cone-shaped grid or ash shaker 56 is positioned below grid 54. The cone-shaped grid 56 has an annular outer ring 58 surrounding the cone-shaped portion. Ring 58 acts as a charcoal rest collar near to the food warming chambers 60. Thus, charcoal will fall down through grating 20 and grid 54. Larger pieces of charcoal will roll down the sloping sides of cone-shaped grid 56 onto the collar or ring 58, while smaller ash particles will fall down through grid 56 onto a suitable ash collector tray (not illustrated).

Figure 4:
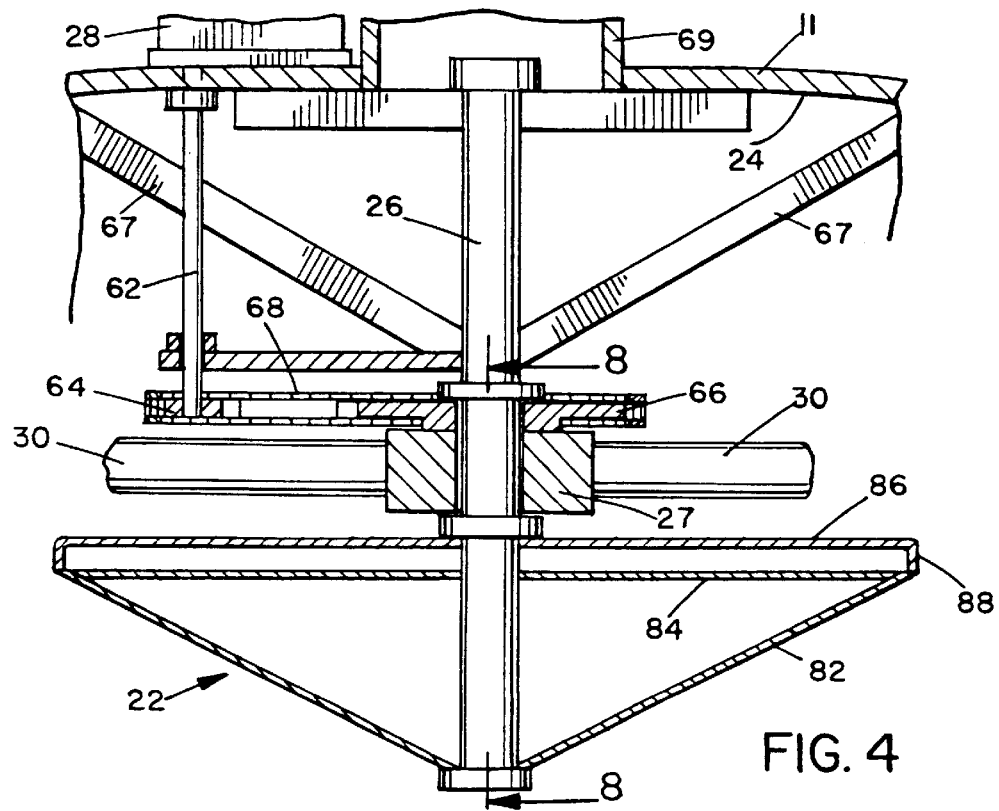
FIG. 4 is an enlarged sectional view taken on line 4—4 of FIG. 3.
Figure 5:
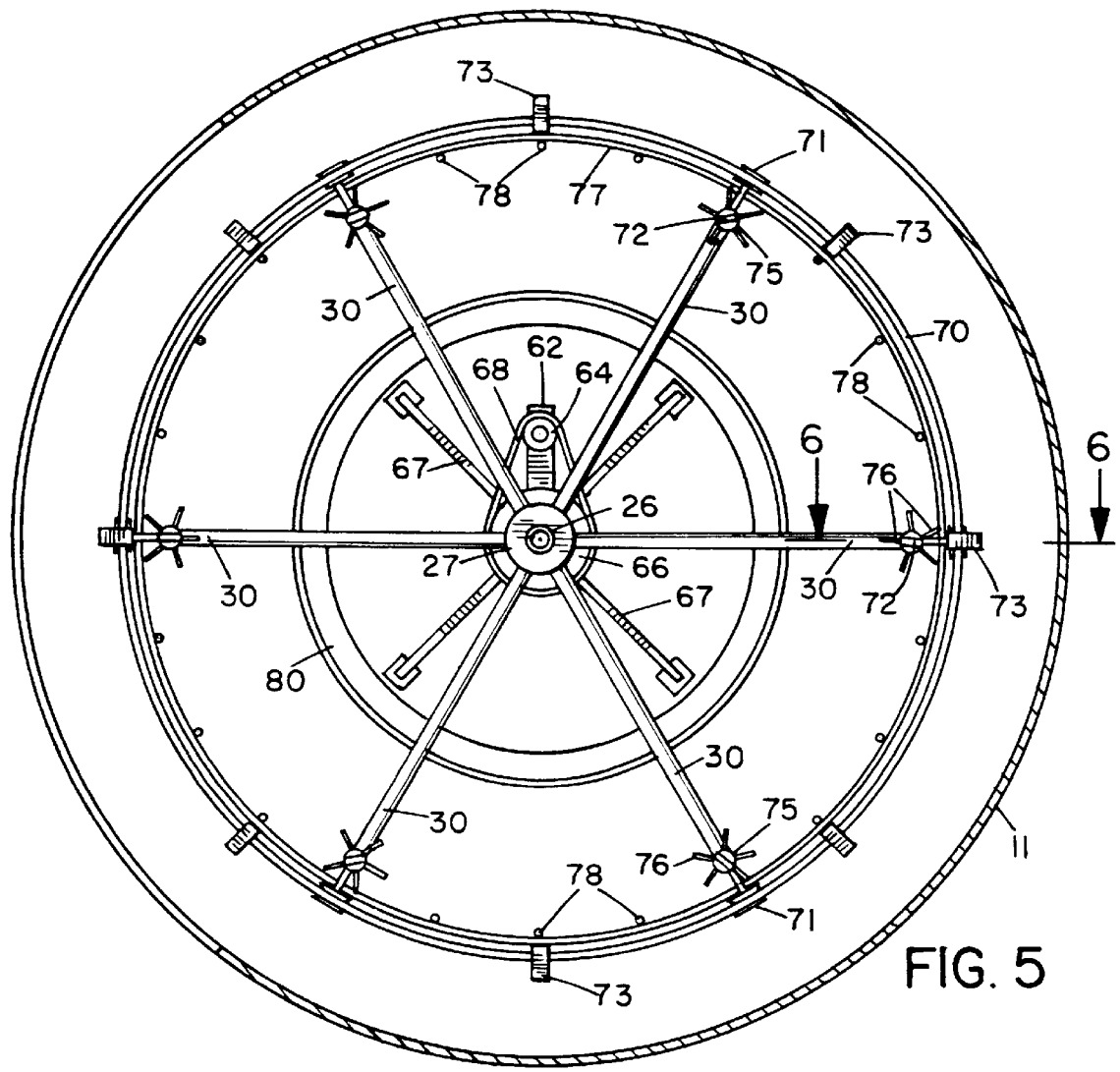
FIG. 5 is a sectional view taken on line 5—5 of FIG. 3.

Motor 28 has a rotating drive axle 62 extending down through the roof of the housing to one side of the support post 26, as illustrated in FIG. 4. A first, drive gear 64 is mounted on the lower end of axle 62, while a second gear wheel 66 is rotatably mounted on support post 26 in alignment with drive gear 64. Gear wheel 66 is secured to hub 27 in any suitable manner. A chain 68 extends around both gear wheels 64 and 66, as best illustrated in FIG. 5, so that rotation of axle 62 will also rotate hub 27, along with the radial arms 30. Upper and lower collars on post 26 hold and position the hub 27.

Support post 26 is secured to the ceiling of the cooking chamber via suitable support struts 67, as best illustrated in FIGS. 3 and 4. Exhaust pipe 69 projects upwardly from the center of the dome ceiling, as best illustrated in FIGS. 1 and 4, to provide a gas vent from cooking chamber 12. Preferably, the dome-shaped cooking chamber has an outer wall of heat insulating bricks (not illustrated) to reduce heat loss.

Figure 6:
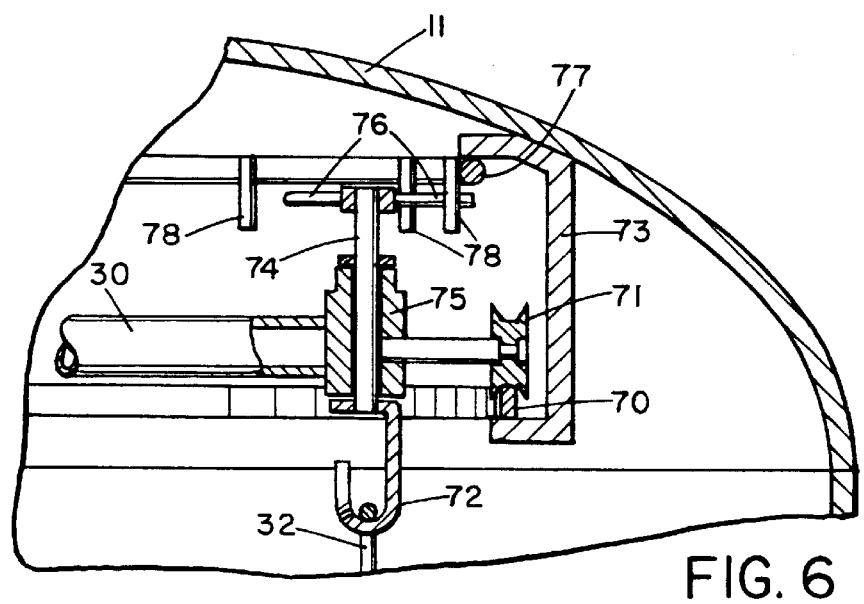
FIG. 6 is an enlarged sectional view taken on line 6—6 of FIG. 5.
Figure 7:
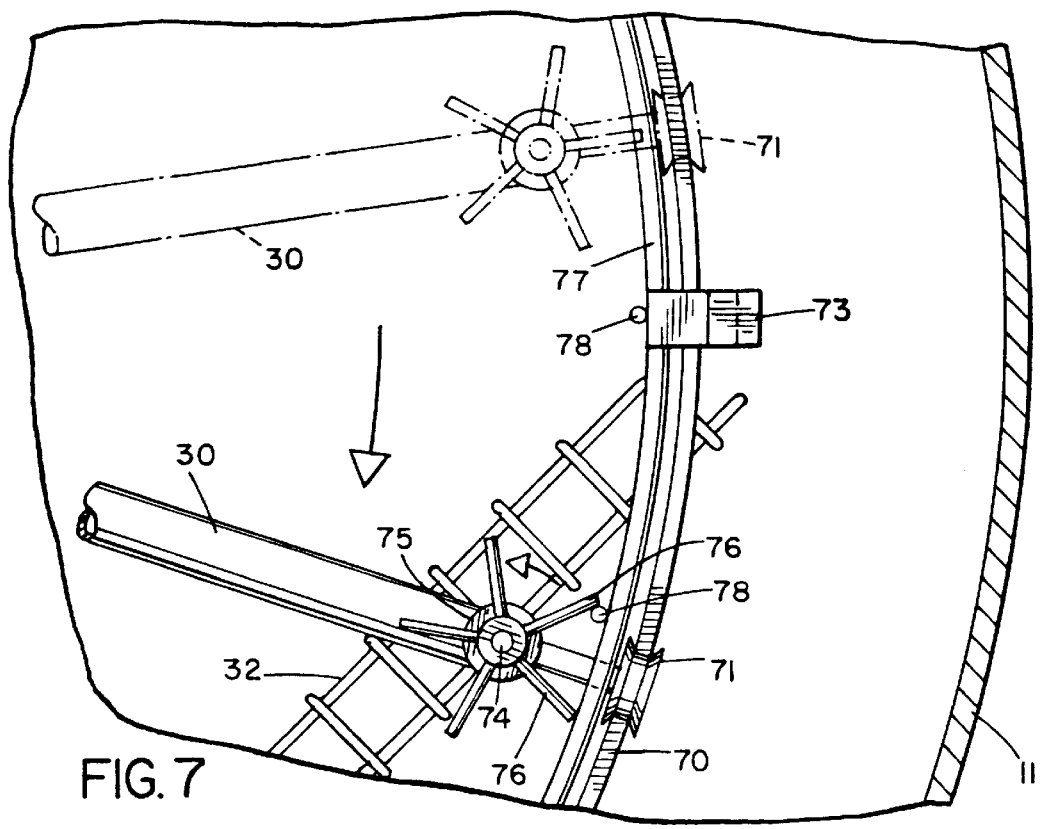
FIG. 7 is a top plan view of the structure of FIG. 6, with the top cut away to show the rotary actions.

As best illustrated in FIGS. 5 and 6, a circular track or rail 70 runs around the housing adjacent the outer ends of the radial arms 30, and each arm 30 has a roller or wheel 71 at its outer end which runs on rail 70 for stability and alignment purposes. Track 70 is supported in a series of brackets 73 mounted at spaced intervals in a circular path around the ceiling, as best illustrated in FIGS. 3 and 6. Each rack 32 is suspended from a hook 72 secured to a shaft 74 which projects upwardly through a bearing 75 at the end of the respective arm 30, as illustrated in FIG. 6. A star wheel having five radial spokes 76 is secured at the upper end of shaft 74. An inner ring 77 is also supported on brackets 73, and a series of spaced, downwardly depending pins or actuator rods 78 are mounted around ring 77 in the path of the star wheels 76, as best illustrated in FIGS. 5, 6 and 7, so that when each star wheel reaches a respective rod 78, one of its spokes 76 will contact the rod 78, causing the star wheel and shaft 74 to rotate in bearing 75, simultaneously rotating the suspended rack 32 by a small amount. When the star wheel reaches the next rod 78, another spoke 76 will contact the rod and be forced to rotate. Thus, as the arms 30 rotate about the central axis of the housing, each food rack 32 is also rotated about the axis of shaft 74, ensuring even cooking. It will be understood by those skilled in the field that the illustrated mechanism for rotating the racks 32 is one possible example and other alternative drive means may be used, such as a motorized drive for each shaft 74.

An annular, generally conical-shaped metal heat trap 80 is suspended from the ceiling of the cooking chamber directly above the heat source so as to direct exhaust gases upwardly and out through the exhaust pipe 69. Additionally, the heat reflector 22 directly above the heat source acts to reflect heat back towards the food holding racks, and also directs hot air and gas to flow to the rear of the cooking chamber rather than being lost through the open front 40 of the cooking chamber.

Figure 8:
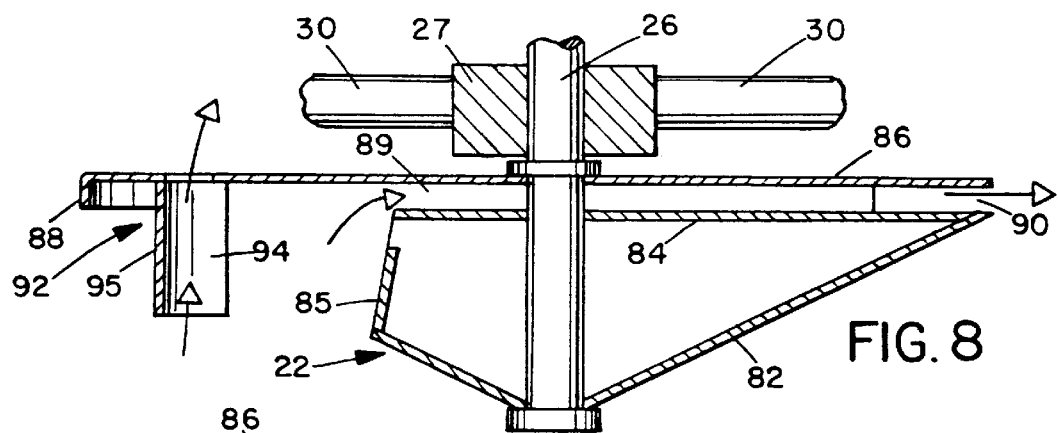
FIG. 8 is a sectional view taken on line 8—8 of FIG. 4.
Figure 9:
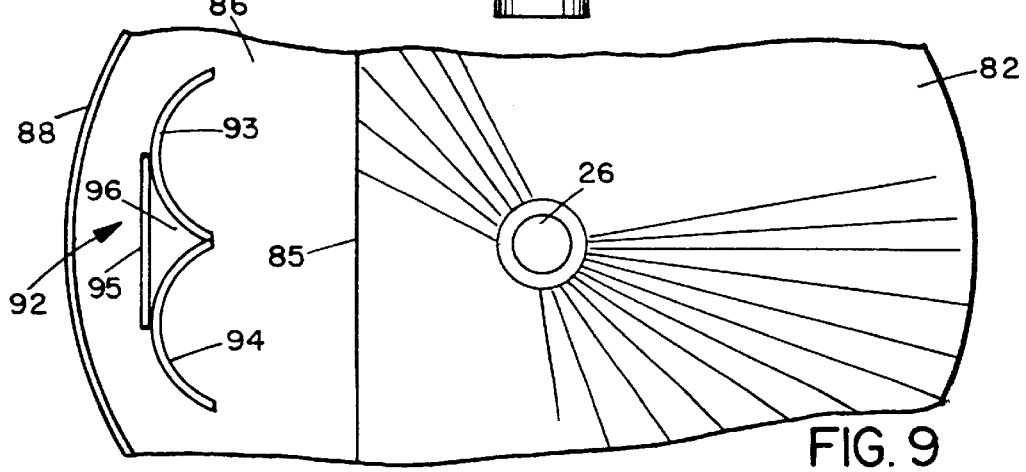
FIG. 9 is an underside view of the structure of FIG. 8.

The structure of heat reflector 22 is illustrated in detail in FIGS. 3, 4, 8 and 9. As best illustrated in FIGS. 3 and 4, reflector 22 basically comprises a hollow, inverted cone member 82 having a first lid 84 welded across its open upper end. The cone member is cut off at the front to form an inwardly inclined front end, over which a wall 85 is welded. An upper cover plate or shield member 86 with a downwardly directed peripheral rim 88 is welded around part of the periphery of wall 84 at a spacing above wall 84 so as to leave a gap 89 at the front end of the cone and a rear gap 90 at the rear end of the cone, for air flow from the front to the rear. The rim 88 is of gradually reducing height so that there is no rim at the rear of the dome, providing rear gap 90 as illustrated in FIG. 8. As best illustrated in FIGS. 8 and 9, the upper cover plate projects forwardly from gap 89 towards the front end of the cooking chamber, so that hot air will be directed towards the cone. A heat trap 92 is suitably welded to cover plate 86 so as to depend downwardly from the cover plate 86 at a location spaced forwardly from cone 82, as best illustrated in FIG. 8. The heat trap 92 preferably comprises two concave metal sheets 93,94 secured together by a third sheet 95 welded across the outer faces of sheets 93 and 94, as illustrated in FIG. 9, with the concave sides of the sheets facing inwardly towards the reflector cone 82. A hollow space 96 is defined between sheets 93,94 and 95. Hot air is also directed through space 96 and an aligned opening in cover plate 86 towards the top of the dome (see FIG. 8).

With this arrangement, hot air and combustion gases traveling upwardly from the heat source on rack 20 will tend to be reflected outwardly towards the food supporting racks by the conical surface of cone 82. At the same time, the reflector 22 tends to recirculate hot air into the cooking area and reduce heat loss through the open front of the housing. Hot air traveling upwardly will be trapped between heat trap 92 and the cone 82, and will be directed towards the cone and through gaps 89 and 90, in the direction of the arrows in FIG. 8, towards the rear of the housing for recirculation. At the same time, the cone and cover plate will tend to reduce upward dispersion of hot air and absorption by the conical insulated hood. The reflective inner surface of the dome also tends to reflect hot gas back into the cooking area. This arrangement has been found to substantially reduce heat losses while still permitting a 40% open cooking chamber.

Preferably, the entire heat reflector arrangement 22 is made of sheet metal such as stainless steel. The cover plate 86 may be secured to the lid 84 at the rear of the device via a screw fastener to allow adjustment of the size of gap or opening 90, due to the flexibility of sheet metal cover plate 86.

The cooking apparatus or oven of this invention can be used to cook many different types of foods simultaneously and efficiently, either indoors or outdoors, such as meat, poultry, fish, vegetables, fruit, bread, pizza, cakes, and so on. The user simply places the desired foods in the racks, and suspends each rack from the hook at the end of each rotating arm 30. Suitable fuel is placed on grate or rack 20 and the fire is lit. At the same time, the motor 28 is turned on, and the hub 27 starts to rotate, simultaneously rotating arms 30 to move each food holding rack 32 in an annular path above the slanted drip tray 34, while the rack itself is rotated about its axis to ensure even heating of the food carried by the rack. Although six radially extending food supporting arms 30 are provided in the illustrated embodiment, a greater or a lesser number of arms 30 may be provided in alternative arrangements, depending on the desired cooking capacity.

The food to be cooked travels in an annular path around the heat source, never coming into direct contact with the flames. Any fat, juices, or blood dripping from the cooking food is collected in the slanted drip tray, and does not fall onto the fire where it would otherwise be burnt, producing unhealthy smoke and contamination of the taste of the food. Instead, such contaminants will simply flow down and be collected in the grease collection drawers, and can be readily disposed of. Since the cooking chamber is not completely closed, but has a permanent, 40% open front, the problems of restricted air circulation potentially affecting the taste of different foods being cooked simultaneously are avoided or reduced. The cooking efficiency is maintained in spite of the front opening of the cooking chamber, due to the heat trap and reflector above the fire which acts to direct hot air outwardly towards the food to be cooked and to reduce loss of heat through the opening.

The food warming chambers in the base of the housing permit raw food mounted in racks to be placed in one warming chamber on one side of the housing for preheating prior to cooking. The racks can then be placed on the hooks suspended from the rotating arms in the cooking chamber. After cooking, the racks can be removed and placed into another food warming chamber if necessary. This arrangement has been found to permit up to eighteen full racks of food per hour to be cooked. Each rack is preferably around 24 inches wide and 18 inches high, permitting up to five chickens, for example, to be secured in a single rack. Thus, up to 90 chickens per hour can be cooked in the oven of this invention. Equivalent quantities of other types of food, or combinations of different foods, may be cooked in an equivalent time, and the problems of uneven cooking, food blackening or burning, and taste contamination, are reduced or eliminated.

Although a preferred embodiment of the invention has been described above by way of example only, it will be understood by those skilled in the field that modifications may be made to the disclosed embodiment without departing from the scope of the present invention, which is defined by the appended claims.

We claim:
1. A cooking apparatus, comprising:
   an outer housing defining a cooking chamber having a front portion;
   the housing having at least one permanently open opening extending across the front portion of the chamber, the opening being of sufficient size for access into the cooking chamber to load and unload food, and providing for air flow into the cooking chamber during cooking;
   a heat source at the center of the cooking chamber;
   a plurality of food holding racks for supporting food to be cooked mounted at spaced intervals in a path around the heat source and spaced outwardly from the heat source;
   a mounting assembly for supporting the racks at spaced intervals around said path; and
   a drive mechanism for rotating the mounting assembly so that the racks travel in said path around the heat source.
2. A cooking apparatus, comprising:
   an outer housing defining a cooking chamber;
   the housing having at least one opening for air flow into the cooking chamber;
   a heat source at the center of the cooking chamber;
   a plurality of food holding racks for supporting food to be cooked mounted at spaced intervals in an annular path around the heat source and spaced outwardly from the heat source;
   a mounting assembly for supporting the racks at spaced intervals around said path;
   a drive mechanism for rotating the mounting assembly so that the racks travel in said annular path around the heat source; and
   said mounting assembly comprising a central rotatable hub and a plurality of radial arms projecting radially outwardly from the central shaft to said annular path, each food holding rack being secured to a respective one of said arms, and the drive mechanism comprises means for rotating said central hub.
3. The apparatus as claimed in claim 2, wherein each rack is rotatably mounted on the respective arm for rotation about a rack axis, and further including a second drive mechanism for rotating each rack about said rack axis.
4. A cooking apparatus, comprising:
   an outer housing defining a cooking chamber;
   the housing having at least one opening for air flow into the cooking chamber;
   a heat source at the center of the cooking chamber;
   a plurality of food holding racks for supporting food to be cooked mounted at spaced intervals in a path around the heat source and spaced outwardly from the heat source;

a mounting assembly for supporting the racks at spaced intervals around said path;

a drive mechanism for rotating the mounting assembly so that the racks travel in said path around the heat source; and at least one drip pan extending around said rack path beneath said racks for collecting material dripping from food cooking in said racks.

5. A cooking apparatus, comprising:

an outer housing defining a cooking chamber;

the housing having at least one opening for air flow into the cooking chamber;

a heat source at the center of the cooking chamber;

a plurality of food holding racks for supporting food to be cooked mounted at spaced intervals in a path around the heat source and spaced outwardly from the heat source;

a mounting assembly for supporting the racks at spaced intervals around said path;

a drive mechanism for rotating the mounting assembly so that the racks travel in said path around the heat source; and a heat reflector above the heat source for reflecting hot air outwardly towards the food holding racks.

6. The apparatus as claimed in claim 5, wherein the cooking chamber has an upper ceiling portion and the heat reflector comprises an inverted cone-shaped member suspended from the ceiling portion above the heat source.

7. The apparatus as claimed in claim 6, wherein a portion of the cone facing said opening is cut off, and a cover plate projects forwardly from said cut-off portion towards said opening, and a heat trap is suspended downwardly from said cover plate in front of said cut-off portion to direct hot air towards said cone and away from said opening.

8. A cooking apparatus, comprising:

an outer housing defining a cooking chamber;

the housing having at least one opening for air flow into the cooking chamber;

a heat source at the center of the cooking chamber;

a plurality of food holding racks for supporting food to be cooked mounted at spaced intervals in a path around the heat source and spaced outwardly from the heat source;

a mounting assembly for supporting the racks at spaced intervals around said path;

a drive mechanism for rotating the mounting assembly so that the racks travel in said path around the heat source; and said outer housing including a base beneath said cooking chamber, and a central cylinder extending through said base to said central heat source.

9. The apparatus as claimed in claim 8, including at least one enclosed food warming chamber in said base adjacent said cylinder.

10. The apparatus as claimed in claim 8, including an air intake tube projecting into the central cylinder for air intake to the heat source, the air intake tube having an open outer end and a shutter for selectively closing the outer end of the air intake tube.

11. The apparatus as claimed in claim 1, wherein the cooking chamber has a dome-shaped ceiling.

12. The apparatus as claimed in claim 1, wherein said cooking chamber has an outer surface area and said opening extends over 30% to 50% of the surface area of said housing.

* * * * *